(12) United States Patent
Cornell et al.

(10) Patent No.: US 6,213,579 B1
(45) Date of Patent: Apr. 10, 2001

(54) METHOD OF COMPENSATION FOR THE EFFECTS OF THERMALLY-INDUCED DROPLET SIZE VARIATIONS IN INK DROP PRINTERS

(75) Inventors: Robert Wilson Cornell; Scott Michael Heydinger; James H. Powers, all of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/198,852

(22) Filed: Nov. 24, 1998

(51) Int. Cl.[7] .............................. B41J 29/38; B41J 2/205; B41J 29/393
(52) U.S. Cl. .............................. 347/14; 347/15; 347/17; 347/19
(58) Field of Search .................................. 347/17, 7, 43, 347/14, 15, 19, 18; 400/120.14; 358/283

(56) References Cited

U.S. PATENT DOCUMENTS

| | | |
|---|---|---|
| 4,352,114 | 9/1982 | Kyogoku et al. . |
| 4,584,601 | 4/1986 | Suzuki et al. . |
| 4,758,897 * | 7/1988 | Hiratsuka et al. .................. 358/283 |
| 4,829,323 | 5/1989 | Suzuki et al. . |
| 4,860,034 | 8/1989 | Watanabe et al. . |
| 4,876,569 | 10/1989 | Nishitoku . |
| 4,896,172 | 1/1990 | Nozawal et al. . |
| 4,910,528 * | 3/1990 | Firl et al. .............................. 347/17 |
| 4,980,699 | 12/1990 | Tanabe et al. . |
| 5,006,867 | 4/1991 | Koizumi et al. . |
| 5,107,276 | 4/1992 | Kneezel et al. . |
| 5,109,275 | 4/1992 | Naka et al. . |
| 5,142,302 | 8/1992 | Kano . |
| 5,168,284 | 12/1992 | Yeung . |

(List continued on next page.)

OTHER PUBLICATIONS

Cornell, Robert, *A Theoretical and Experimental Examination of the Bubble Jet Energy Window*, IS&T's 47th Annual Conference/ICPS 1994, pp. 587–590.

Cornell, Robert, *A Theoretical and Experimental Examination of Thermal Ink Jet Nucleation Criteria*, IS&T's NIP 12: International Conference on Digital Printing Technologies, pp. 19–24.

Ruckdeschel, F. R. and Hauser, O. G., *Yule–Nielsen effect in printing: a physical analysis*, Applied Optics, vol. 17, No. 21, Nov. 1, 1978, pp. 3376–3383.

Arney, J. S., et al., *The Impact of Paper Optical Properties on Hard Copy Image Quality*, IS&T's NIP 12: International Conference on Digital Printing Technologies, 1996, pp. 166–168.

(List continued on next page.)

Primary Examiner—John Barlow
Assistant Examiner—An H. Do
(74) Attorney, Agent, or Firm—John Harmeyer, Esq.; D. Brent Lambert

(57) ABSTRACT

An apparatus and method is provided for compensating for the effects of thermally induced droplet size variations in ink-jet printers. The apparatus includes a temperature determination unit for determining the temperature of the print head, and a halftone adjustment unit configured to receive the print head temperature from the temperature determination unit and to receive image data in the form of nominal halftone values. The adjustment unit can increase or decrease the number of dots to be printed, and thereby compensate for droplet size variations, either by adjusting the nominal halftone values based upon the temperature or by adjusting a threshold array based upon the temperature. The temperature determination unit can predict the print head temperature by counting the number of dots to be printed by counting the binary halftone values fed to the swath memory.

27 Claims, 6 Drawing Sheets

U.S. PATENT DOCUMENTS

| | | |
|---|---|---|
| 5,172,130 | 12/1992 | Takahashi . |
| 5,172,142 | 12/1992 | Watanabe et al. . |
| 5,175,565 | 12/1992 | Ishinaga et al. . |
| 5,223,853 | 6/1993 | Wysocki et al. . |
| 5,235,346 | 8/1993 | Yeung . |
| 5,300,969 | 4/1994 | Miura et al. . |
| 5,418,558 | 5/1995 | Hock et al. . |
| 5,475,405 | 12/1995 | Widder et al. . |
| 5,483,265 | 1/1996 | Kneezel et al. . |
| 5,553,200 | 9/1996 | Accad . |
| 5,559,535 | 9/1996 | Otsuka et al. . |
| 5,594,557 | 1/1997 | Rolleston et al. . |
| 5,610,638 * | 3/1997 | Courtney ................................ 347/14 |
| 5,614,934 | 3/1997 | Yoshida et al. . |
| 5,627,572 | 5/1997 | Harrington, III et al. . |
| 5,633,671 | 5/1997 | Watanabe . |
| 5,646,655 * | 7/1997 | Iwasaki et al. ......................... 347/17 |
| 5,658,471 | 8/1997 | Murthy et al. . |
| 5,661,510 | 8/1997 | Brandon et al. . |
| 5,661,514 | 8/1997 | Lukis et al. . |
| 5,673,069 | 9/1997 | Canfield et al. . |
| 5,684,516 | 11/1997 | Cseledy et al. . |
| 5,708,518 | 1/1998 | Parker et al. . |
| 5,847,724 * | 12/1998 | Mantell ................................... 347/15 |
| 5,903,289 * | 5/1999 | Takayanagi ............................. 347/43 |
| 6,000,776 * | 12/1999 | Suzuki et al. .......................... 347/19 |
| 6,022,093 * | 2/2000 | Arai et al. .............................. 347/14 |
| 6,027,196 * | 2/2000 | Gotoh et al. ............................. 347/7 |

OTHER PUBLICATIONS

Foley, James D., et al., *Computer Graphics, Principles and Practice*, Second Edition, Addison–Wesley Publishing Company, 1991, pp. 564–567.

*The Photographic Process and Concepts*, The Seybold Report on Desktop Publishing, Oct. 2, 1991, pp. 4–14.

Dvorak, Charles A. and Hamerly, James R., *Just–Noticeable Differences for Text Quality Components*, 1983, Journal of Applied–Photographic Engr. 9, Society of Photographic Scientists and Engineers, pp. 97–100.

Kubelka, Paul, *New Contributions to the Optics of Intensely Light–Scattering Materials. Part I*. Journal of the Optical Society of America, vol. 38, No. 5, May, 1948, pp. 448–457; and *New Contributions to the Optics of Intensely Light–Scattering Materials. Part III: Nonhomogeneous Layers*, pp. 330–335.

Parton, Kenneth and Berns, Roy S.; *Color Modeling of Ink–Jet on Paper Using Kubelka–Munk Theory*, Proc. of IS&T 7th Int. Conf. Advances in Non Impact Printing Tech, Oct. 1991, pp. 271–280.

Jodd and Wyszecki, "Physics and Psychophysics of Colorant Layers", Color in Business, Science & Industry, 1975, pp. 420–439.

Kang, Henry R., *Kubelka–Munk Modeling of Ink Jet Mixing*, Journal of Imaging Technology, vol. 17, No. 2, Apr./May, 1991, pp. 76–83.

Ulichney, R., "Dithering with Blue Noise", Chapter 8, *Digital Halftoning*, MIT Press, 1990, pp. 233–243.

William A. Buskirk, et al., *Development of a High–Resolution Thermal Inkjet Printhead*, Hewlett–Packard Journal, 1988, pp. 55–61.

* cited by examiner

| NOMINAL HALFTONE LEVELS (FROM CONVERTER 14) | TEMP = 35C ADJUSTED HALFTONE LEVELS | TEMP = 40C ADJUSTED HALFTONE LEVELS | TEMP = 45C ADJUSTED HALFTONE LEVELS | TEMP = 50C ADJUSTED HALFTONE LEVELS | TEMP = 55C ADJUSTED HALFTONE LEVELS |
|---|---|---|---|---|---|
| 0 | 0 | 0 | 0 | 0 | 0 |
| 1 | 1 | 1 | 1 | 1 | 1 |
| 2 | 2 | 2 | 2 | 1 | 1 |
| 3 | 3 | 3 | 2 | 2 | 2 |
| 4 | 4 | 4 | 3 | 3 | 2 |
| 5 | 5 | 4 | 4 | 3 | 3 |
| 6 | 6 | 5 | 5 | 4 | 3 |
| 7 | 7 | 6 | 5 | 4 | 4 |
| 8 | 8 | 7 | 6 | 5 | 4 |
| 9 | 9 | 8 | 7 | 6 | 5 |
| 10 | 10 | 9 | 8 | 6 | 5 |
| 11 | 11 | 10 | 8 | 7 | 6 |
| 12 | 12 | 11 | 9 | 8 | 6 |
| 13 | 13 | 11 | 10 | 8 | 7 |
| 14 | 14 | 12 | 11 | 9 | 7 |
| 15 | 15 | 13 | 11 | 9 | 8 |
| 16 | 16 | 14 | 12 | 10 | 8 |
| 17 | 17 | 15 | 13 | 11 | 9 |
| ... | ... | ... | ... | ... | ... |
| 248 | 248 | 217 | 186 | 155 | 124 |
| 249 | 249 | 218 | 187 | 156 | 125 |
| 250 | 250 | 219 | 188 | 156 | 125 |
| 251 | 251 | 220 | 188 | 157 | 126 |
| 252 | 252 | 221 | 189 | 158 | 126 |
| 253 | 253 | 221 | 190 | 158 | 127 |
| 254 | 254 | 222 | 191 | 159 | 127 |
| 255 | 255 | 223 | 191 | 159 | 128 |

FIG. 2

| COUNT VALUE (I) | ESTIMATED PRINT HEAD TEMP (T) |
|---|---|
| 0 TO 24,999 | 35 |
| 25,000 TO 49,999 | 40 |
| 50,000 TO 74,999 | 45 |
| 75,000 TO 99,999 | 50 |
| 100,000 TO 200,000 | 55 |

FIG. 6

METHOD OF COMPENSATION FOR THE EFFECTS OF THERMALLY-INDUCED DROPLET SIZE VARIATIONS IN INK DROP PRINTERS

TECHNICAL FIELD

The present invention relates to systems and methods for compensating for thermally induced variations in the size of droplets ejected from an ink-jet print head and, ore particularly, to a control method and apparatus in which halftone levels are adjusted based upon the temperature of the print head, so that the number of dots printed per unit area is adjusted based upon the temperature to thereby compensate for thermally-induced variations in the printed image.

BACKGROUND OF THE INVENTION

Today, thermal ink-jet printers have gained wide acceptance for use in printing computer images due to their small size, portability, efficiency, and ability to produce high quality print. The print head of a typical thermal ink-jet printer has a plurality of precisely-formed nozzles, each nozzle being in fluid communication with a chamber that receives ink from an ink reservoir. Each chamber is adjacent to an electrical resistance element, known as a thermal ink-jet resistor, which is located opposite the nozzle so that ink can collect between the nozzle and the resistor. Electric printing pulses heat the thermal ink-jet resistor, causing a small portion of the ink adjacent to the resistor to become vaporized, thereby imparting mechanical energy to a quantity of the ink and propelling the ink through the nozzle of the print head toward a print medium. The ejected drops collect on the medium and form printed characters and/or images thereon. The printing is generally accomplished by incrementally moving the medium in a first direction relative to the print head and moving the print head in a second direction which is perpendicular to the first direction. A number of nozzles may be supplied across the print head so that a number of droplets may be fired from the print head at once. The spacing of the nozzles and the incremental stepping of the print head and the medium define the resolution of the printed image. A printer with 600 dots per inch resolution can print 600 dots per square inch or, in other words, each dot printed from the print head can cover approximately $\frac{1}{600} \text{th} \times \frac{1}{600} \text{th}$ square inch area. This small area which may be covered by one dot is generally referred to as a picture element, or "pixel".

Halftone printing is a type of printing that can be used to print text but is particularly useful for printing graphical images, such as in desktop publishing, so that more detailed images can be created. The method takes advantage of the tendency of the human eye to blur together groups of dots and merge them into a single perceived shade. The more dots per unit area, the darker the shade will appear.

Typically, such printing entails dividing the source image into a number of pixels which corresponds to the resolution of the printer, and then assigning each pixel a halftone level, depending on the shade of gray of the particular pixel from the source image. The shade falls within a gray scale which is a progressive series of shades, ranging from black through white. The number of shades of gray which can be used to describe each pixel in the source image (and thus the number of halftone levels) depends upon the amount of memory allocated for each pixel to be printed. The more bits used in coding shades of gray, the more gradations which become possible. For example, the use of two bits per pixel allows for four halftone levels per pixel, six bits allows 64 levels, and 8 bits allows 256 levels. However, as the number of bits increases, so does the need for storage capacity. For example, with 256 shades of gray, one byte of storage is required for each pixel in the image. Accordingly, a small image 100 pixels wide by 100 pixels high requires 10,000 bytes of storage. As a result, detail and storage requirements are usually balanced to provide the best possible image at the least cost in storage capacity.

The halftone level of each pixel corresponds to a probability of printing a dot at that particular pixel. For example, in one embodiment, a halftone value of zero means that a black dot absolutely should not be printed at that pixel, a value of 255 means that a dot absolutely should be printed at that pixel, and a value of 128 means that there would be slightly more than a 50% chance ($^{128}/_{255}$) that a dot would be printed at that particular pixel. Thus, for example, a source image which consists of an entire page colored a "medium" gray color would typically be mapped such that all the pixels to be printed on the printed medium are assigned a halftone level of 128, thereby creating a 50% chance at each pixel that a dot will be printed. Thus, on that page, dots will be placed at approximately 50% of the available pixels. When printed, the dots visually blur together to appear as a "medium" shade of gray.

However, the quality and consistency of the halftone images printed by ink-jet printer is affected by the temperature of the print head. As the temperature of the print head rises, the drop size produced by each nozzle increases, because the rise in temperature lowers the viscosity of the ink in the chamber, causing larger vapor bubbles to be produced, thereby ejecting more massive droplets. Accordingly, the larger droplets make bigger spots on the page upon which the printer is printing, and these larger spots, in turn, cause the image that is produced to look different than the image that is produced when the print head is operating at a lower temperature. Moreover, more massive droplets mean that more ink is being deposited on the page, increasing the chances that paper cockling and ink smearing may occur.

The temperature of the print head rises most significantly when a very dark image is being printed, because numerous dots are being ejected from the print head to produce the dark image, and numerous resistors are being heated to produce the dots, the accumulated heat of the resistors raising the temperature of the print head. Thus, as the print head finishes a line of print, or "swath", the print head will often be at a higher temperature than when it began the swath. Also, the print head may remain at this higher temperature during the next swath to be printed. For example, a page that is intended to be printed as a uniform shade of gray may turn out with variations in the shade of gray produced at various locations on the page. If the print head prints from left to right, and from top to bottom, the right part of the page may be at a darker shade of gray than the left part of the page and, similarly, the bottom half of the page may be a darker shade of gray than the top half of the page. Moreover, if the print head temperature during actual printing is different than the print head temperature assumed in generating the halftone levels, then the shades of the printed image will not correspond well with the source image data.

Previously, the problem of poor print quality due to temperature variations has been addressed by controlling the temperature of the print head. However, because active cooling, such as through the use of thermo-electrical cooling, circulation pumps, and the like, is not cost effective, passive cooling has been the method utilized by most thermal ink-jet manufacturers. One method of passive cooling is to utilize an aluminum heat sink to absorb the heat generated by the print head. In utilizing this method, after each print line, the micro code of the printer will command the print head to wait in the margin until the print head cools to the desired temperature range through dissipation of heat to the heat sink.

However, passive cooling of the print head is not without disadvantages. The additive affect of the delay while the print head cools can become quite noticeable over time and have a substantial impact on the throughput of the printer. In addition, if the print head is not cooled to nearly the same temperature prior to each print line, the print head will produce a variable droplet size, and therefore a variable output, from swath to swath. Such swath to swath variations are extremely problematic because they are the most visible. Moreover, both passive and active temperature control methods require the use of a temperature sensor on the print head, which can wear out and add to the cost of the printer. In addition, for temperature control schemes to be successful, the print head temperature must be maintained within about a 5C range, and maintaining such control while allowing the print head input power to roam freely for all densities of print can be difficult and expensive.

Another approach to the problem of temperature variations has been to vary the voltage and pulse width applied to the resistance elements that cause the droplets to be formed and ejected. For example, U.S. Pat. No. 5,483,265, issued to Kneezel et al., discloses a control method in which the temperature of the print head of the ink-jet printer is sensed and the heater element 26 is energized with a pulse of predetermined power and duration based on the sensed temperature, such that the resulting spot size is near the optimum size. According to the patent, after the print head temperature is sensed, a predetermined pulse duration and voltage for the sensed print head temperature can be retrieved from a lookup table and then applied to the heater element. If the sensed temperature is greater than a predetermined temperature for the desired ink droplets size, the pulse duration is shortened and the pulse voltage is increased to maintain the desired droplet size. However, if the sensed temperature is less than the predetermined temperature, the pulse duration can be lengthened and the voltage can be decreased to maintain the desired size.

U.S. Pat. No. 5,610,638 issued to Courtney, discloses another approach to the compensating for temperature induced droplet size variations. According to this patent, a temperature sensor 16 senses the temperature adjacent to the print head and selects either a single-pass 100% coverage print mode or a double-pass 50% coverage checker board print mode for printing. In the single-pass mode, each swath of printing is printed in one pass, while in the double-pass mode two passes of the print head are used for each swath of printing. The patent also discloses varying the injection rate (or frequency) based upon the sensed temperature. As shown in FIG. 3 of the patent, when the temperature sensed is less than or equal to 30? and the density of the image to be printed is low, the ejection frequency is selected to be 6 khz and the single-pass mode is selected. However, if the image to be printed is determined to be of high density and the temperature is less than or equal to 30?, the frequency is reduced to 4.5 khz and the single-pass mode is maintained. When the temperature is greater than 30? for both low density and high density images, the frequency is kept at 6 khz and the printer utilizes the double-pass mode.

However, the temperature compensation means disclosed by these patents have certain disadvantages. First, both require a temperature sensor to be used to determine the temperature of the print head. Also, adjusting the energy delivered to the nozzles by varying the voltage or pulse width, as disclosed in Kneezel, can reduce print head life, and is ineffective beyond a certain energy level. In addition, while controlling energy levels delivered to the print head may work well for certain types of printers, it may be difficult to implement in ink-jet printers because the mechanics of bubble generation in a thin film of liquid ink make it difficult to precisely control droplet mass by controlling firing energy. Moreover, adjusting the ejection frequency, as disclosed in Courtney, relies on firing droplets at a cycle time that is near the refill time of the print head thereby ejecting larger or smaller droplets. However, unless the manufacturing of the print head and ink cartridge are tightly controlled, the refill time of the printer can vary significantly, thereby causing large differences in refill dynamics and making the control method unpredictable. Neither patent discloses a temperature compensation scheme for halftone printing which involves the control of the number of dots ejected by adjusting halftone levels of pixels based upon temperature, and neither patent discloses a temperature prediction method which counts the number of dots to be fired by the print head to predict the print head temperature.

Accordingly, to overcome the above and other problems, it is desirable to have a system and method for compensating for temperature induced variations of droplet size in a thermal ink-jet printer which does not require tight control of the print head temperature, which does not require adjustment of the print head parameters, and which does not require temperature sensing means. Further, it is desirable to have such a system and method which effectively reduces swath to swath variations in print quality, as well as reduces paper cockling and smearing and increases reservoir lifetime.

SUMMARY OF THE INVENTION

Accordingly, it is an object of the present invention to obviate the above described problems.

It is another object of the present invention to provide a method and apparatus which effectively compensates for thermally induced droplet size variations in a binary ink-jet printer.

Another object of the invention is to compensate for thermally induced droplet size variations without the need for tightly controlling the print head temperature.

Yet another object of the invention is to improve the print quality and consistency produced by ink-jet printers.

Another object of the present invention is to decrease smearing and paper cockling.

It is another object of the present invention to provide a method and apparatus for compensating for droplet size variations in ink-jet printers without the need to adjust print head parameters, such as the voltage and pulse width applied to the print head and/or the firing frequency of the print head.

Another object is to provide such a method and apparatus which is cost effective.

Additional objects, advantages and other novel features of this invention will be set forth in part in the description that follows.

To achieve the forgoing and other objects, and in accordance with the purposes of the present invention as described above, an image processing apparatus is provided comprising a temperature estimation unit and an image adjustment unit. The temperature estimation unit is configured to estimate a temperature of a print head. The image adjustment unit is configured to receive the estimated temperature from the temperature estimation unit and to receive image data. The image adjustment unit is also configured to determine the number of dots to be printed by the print head at various pixel locations based upon the estimated temperature and the image data.

A method of compensating for the effects of thermally induced droplet size variations in a binary printer is also provided. The method comprises the steps of estimating a temperature of a print head, receiving image data, and deciding whether to print a dot at each of a plurality of pixel locations based upon the estimated temperature and the image data received.

Also provided is an image processing apparatus for use in a binary printer comprising a temperature estimation unit and a halftone adjustment unit. The temperature estimation unit is configured to estimate a temperature of a print head. The halftone adjustment unit is configured to receive the print head temperature from the temperature estimation unit and to receive image data comprising nominal halftone values. The halftone adjustment unit is also configured to determine binary halftone values based upon the estimated temperature and the nominal halftone values.

An apparatus for estimating the temperature of a print head is also provided. The apparatus comprises an energy estimation unit and a temperature estimation unit. The energy estimation unit is configured to estimate the energy supplied to a print head. The temperature estimation unit is configured to receive the energy estimated by the energy estimation unit and to estimate an estimated print head temperature based upon the energy supplied.

A method for predicting the temperature of a print head is also provided. The method comprises the steps of estimating the energy to be supplied to the print head, and predicting a print head temperature from the energy to be supplied based upon a predetermined relationship between the energy to be supplied and print head temperature.

Still other objects of the present invention will become apparent to those skilled in this art from the following description wherein there are shown and described preferred embodiments of this invention, simply for purposes of illustration. As will be realized, the invention may take on other aspects and arrangements than those described in detail below without departing from scope of the invention, as defined by the claims.

BRIEF DESCRIPTION OF THE DRAWINGS

While the specification concludes with claims particularly pointing out and distinctly claiming the invention, it is believed that the invention will be better understood from the following description taken in conjunction with the accompanying drawings in which:

FIG. 2 depicts one embodiment of a temperature adjustment look-up table according to the present invention, shown in partial form, such as could be used with the system of FIG. 1;

FIG. 6 is a flow diagram illustrating a method for compensating for the effects of thermally induced droplet size variations in an ink-jet printer, according to the present invention.

DETAILED DESCRIPTION OF THE PREFERRED EMBODIMENTS

Figure 1:
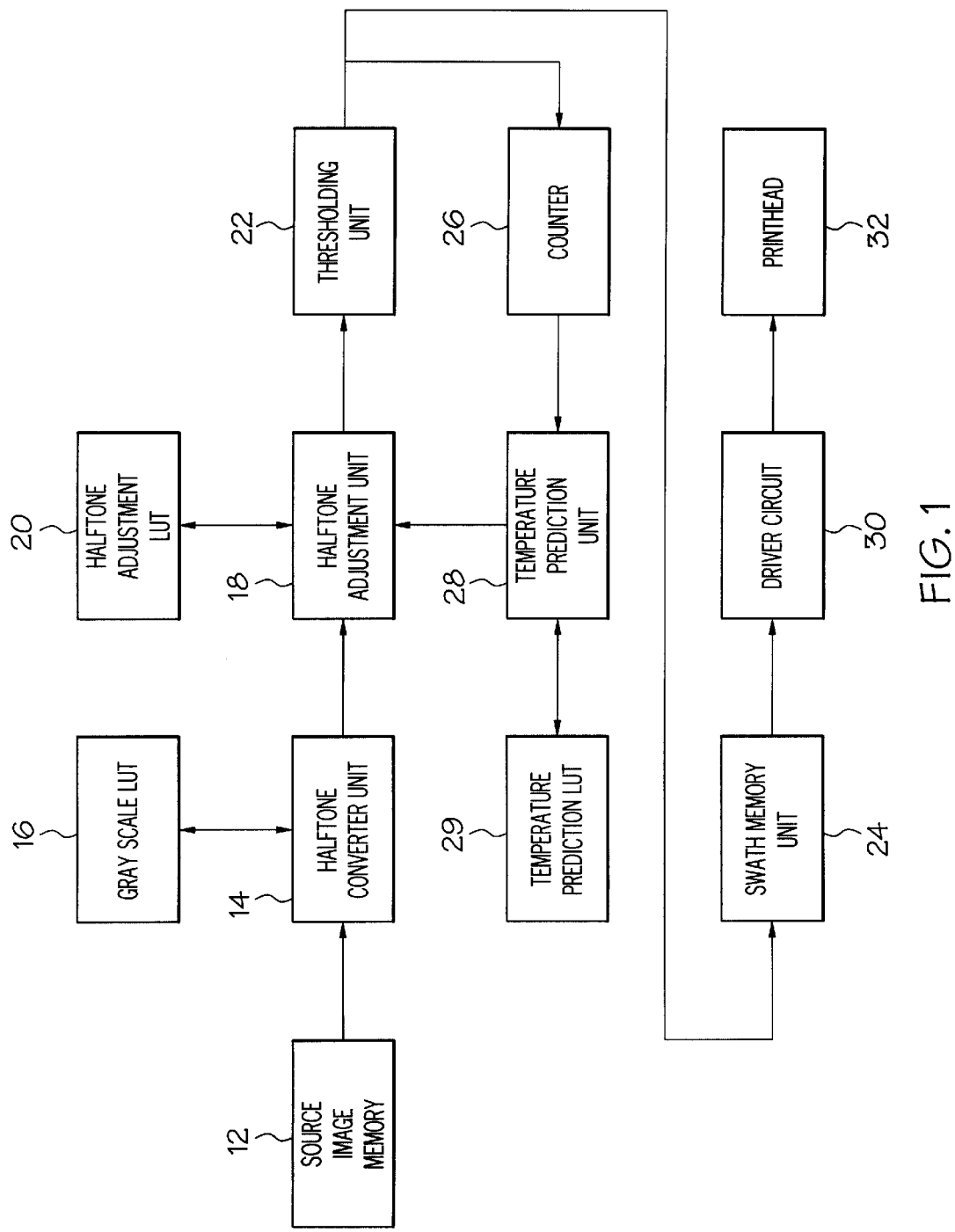
FIG. 1 is a block diagram illustrating an apparatus for compensating for the effects of thermally induced droplet size variations in an ink-jet printer, according to the present invention.

Referring now to the drawings in detail, FIG. 1 is a block diagram depicting a system for compensating for thermally induced droplet size variations in an ink-jet printer, according to the present invention. As shown in the figure, source image information is received from source image memory 12. This information may be stored in a number of forms, and can be received from a number of devices, such as, for example, a computer or processor having software applications for generating source image information, or other imaging devices such as video cameras or scanners, for example. The source image memory is typically at least large enough to hold enough pixels of information to cover an area of the image corresponding to one swath of the image.

The halftone convertor unit 14 receives the source image information from the source image memory 12, preferably one slice at a time, and utilizes a gray scale lookup table (LUT) 16 to convert the various shades of gray in the source image into probabilities of printing a black dot at each pixel location in the slice (i.e., halftone levels), as is known in the art of halftone printing on ink-jet printers. Each pixel location in the slice will have one probability associated therewith, and each probability is preferably represented by 8 bits, thereby allowing for 256 (0–255) distinct probabilities of printing a dot, which correspond to 256 shades of gray represented by the source image information. The value of 0 means that a dot absolutely should not be printed at the particular pixel location and a value of 255 means that a dot absolutely should be printed at the pixel location. It should be understood that other numbers of bits may be used to represent these probabilities.

The gray scale LUT 16 contains correct halftone levels for the image with the assumption that the print head temperature is at a certain nominal temperature, such as room temperature. Thus, the halftone levels, or probabilities, output from the convertor unit 14 are sufficient for correctly printing the desired image on the medium at that nominal temperature.

The output of the halftone convertor unit 14 is fed to a halftone adjustment unit 18 which uses halftone adjustment lookup table 20 to adjust the halftone level assigned to each pixel according to the temperature of the print head. The halftone adjustment unit 18 receives a predicted temperature for the print head from temperature prediction unit 28, which is described in more detail below, and utilizes this temperature to select the correct adjusted halftone level from the lookup table 20.

An exemplary embodiment of a halftone adjustment lookup table 20 is shown in FIG. 2 wherein the halftone convertor output is in the first column and the remaining columns indicate how that output should be adjusted based upon the temperature of the print head. As shown in FIG. 2, the probability of printing a dot typically should be increased at lower temperatures, such as around 35C and should decrease at higher temperatures, such as around 55C. Thus, because of this adjustment of the halftone levels, fewer dots per unit area will be printed at higher temperatures in order to compensate for the larger droplet masses produced at these higher temperatures. Accordingly, the correct half tone shade is achieved by printing fewer, but bigger, dots. In contrast, at lower temperatures, more dots per unit area should be printed because the droplet mass decreases, and the correct shade is achieved by printing more, but smaller, dots. As also shown in FIG. 2, at some nominal temperature, no adjustment is made to the halftone convertor unit output (i.e., no change is made because the print head temperature is at the same temperature used to create gray scale LUT 16).

The lookup tables of FIG. 2 can be created empirically. For example a "nominal" halftone table is printed wherein small patches of various halftone shades of gray are printed in relative isolation so that the print head temperature remains low and relatively constant. Each halftone level from 0 to 255 should be printed in a small patch at this nominal temperature. Then, the print head temperature is changed, such as in 5C increments, by a temperature control means, and small patches of halftone gray shades are printed from 0 to 255 at each of these incremental temperatures. Then, through observation or through measuring the reflective luminance of the various patches, such as by using a spectrophotometer, it can be determined how to configure the data in the lookup tables so that a particular halftone shade looks consistent across the various temperature ranges at which the print head will operate. Tables could be created for other temperature increments, such as, for example, 1C increments or less, for greater halftone adjustment precision.

It should be noted that active or passive cooling means as known in the art, can be implemented with the system of FIG. 1 so that the print head is forced to operate within a particular range of temperatures, such as a 40C range, to prevent air devolution and/or print head damage due to excessive temperature rise. However, because the halftone adjustment unit 18 is utilized, these control means need not control the print head temperature as tightly as prior devices, and the temperature can fall anywhere within the range without affecting image quality. In contrast, a temperature compensation scheme which relies solely on temperature control to prevent unintended image variations needs to maintain head temperature within about a 5C range to adequately prevent such variations.

The output of the halftone adjustment unit 18 is then fed to a thresholding unit 22, wherein the adjusted halftone levels (or probabilities) for each pixel are turned into decisions whether or not to fire or eject a black dot at that particular pixel, such as by using an algorithm as is known in the art of ink-jet printing. Each pixel position may be assigned a threshold value by the thresholding unit 22, such as by using a Bayer matrix, and if the halftone level for the pixel is larger than the corresponding threshold value assigned, it is determined to print a dot at that pixel location. If the probability is not larger then the corresponding threshold value, it is decided not to print a dot at that particular pixel. Accordingly, the halftone level (0 to 255) at each pixel position is used to generate a binary halftone level of 1 or 0 for that pixel position based upon the analysis of the thresholding unit 22. A binary halftone level of 1 means that a dot will be fired at that pixel location and a 0 means that a dot will not be fired at that location. This 1-0 (binary) bit map for the swath is fed to the swath memory unit 24 where it is stored for use by the driver circuit 30. As used herein, the term "halftone algorithm" refers to any algorithm used to convert non-binary halftone values (e.g., a halftone level) for a pixel into a "binary halftone values", and the term "binary halftone values" refers to a determination of whether or not to print a dot at that pixel location.

The information in the swath memory unit 24 is then utilized by the driver circuit 30 to deliver drive pulses to the nozzles of the print head 32 at locations along the swath of the printed medium where dots should be placed. The drive circuit may comprise a heater chip such as disclosed in U.S. Pat. No. 5,661,510, the entire specification of which is incorporated herein by reference. The magnitude and length of each of the drive pulses delivered by the driver circuit 30 are preferably uniform such that the droplet size does not vary based upon the pulse, and a dot is either placed or is not placed at each pixel, as is known in binary printing. In contrast, in continuous tone printers such as dye sublimation printers, the energy level to each nozzle would vary depending upon how big the dot is to be. Thus, binary halftone printing allows for simpler print head design because ink flow does not need to be adjusted to effect droplet size.

The temperature prediction unit 28 of FIG. 1 estimates the temperature of the print head and supplies this temperature to the halftone adjustment unit 18. The temperature is predicted based upon the output of a counter 26 which counts the total number of dots to be printed within the current swath by counting the binary halftone values of "1" output from the thresholding unit 22. Because heat is emitted from a resistor and dissipated across the print head each time a dot is fired from a print head nozzle, the temperature of the print head rises when dots are printed. The greater the number of dots to be printed within the swath the greater the temperature of the print head. Thus, the output of the counter 26 is an estimate of the temperature of the print head, and the temperature prediction unit 28 utilizes the counter output and temperature prediction data stored in LUT 29 to convert the counter output to conventional temperature units, such as degrees Celsius.

The data of temperature prediction LUT 29 relates the number of dots printed to the print head temperature (in conventional form), and, accordingly, is used by temperature prediction unit 28 to determine the output of the temperature prediction unit 28. This data may be determined empirically. For example, a number of swaths can be printed at various halftone levels to determine and the print head temperature can be monitored, such as through a temperature sensor, as the dots are being printed. A tally of the total number of dots that have been printed in the swath, the distance covered by the print head, as well as the rate of ejection (dots per unit time) can be recorded as the printing is proceeding. Based upon these observations, lookup tables or formulas may be devised which relate the rise in temperature to the number of dots printed per unit time and/or the number of dots printed per unit area. Pauses in the print head can also be taken into account. It is known that the temperature of the print head will rise as the number of dots printed per unit time increases, but exactly how this temperature rise occurs for each print head will vary based upon the particular print head construction and other printer parameters.

Thus, the temperature prediction unit 28, temperature prediction LUT 29, and counter 26 can be used to predict or estimate the temperature of the print head. Therefore, temperature sensors are not necessary for the system of FIG. 1 to operate properly. However, it is to be understood that temperature prediction unit 28 and counter 26 can be replaced or supplemented by a temperature sensing unit which can sense the temperature of the print head and supply this temperature to the halftone adjustment unit 18. Also, it should be understood that the temperature prediction unit 28 and temperature prediction LUT 29 can be removed from the system of FIG. 1 and the counter output can be fed directly to the halftone adjustment unit 18, in which case the adjustment unit 18 would adjust halftones based upon the output of the counter 26 (the number of dots to be printed) which can be used as a temperature estimate. Thus, it is contemplated that the halftone adjustment LUT 20 and the LUT of FIG. 2 could comprise a number of columns, wherein each column corresponds to a temperature estimate in the form of a number of dots to be printed rather than in the form of degrees Celsius or degrees Fahrenheit. Accordingly, as used herein, "temperature" could refer to conventional temperature units (i.e., degrees Celsius or degrees fahrenheit) or to other units which are related to temperature, such as number of dots to be printed, number of pulses provided, or energy delivered, for example.

The halftone LUT 16, the halftone adjustment LUT 20, and the temperature prediction unit 28 are preferably stored in a memory device such as a dynamic RAM, a is ROM, an EEPROM, a flash memory, or other persistent storage medium. Similarly, the swath memory unit 24 may be any of a number of memory elements or devices for storing information. The source image memory may also be any of a variety of memory devices and elements.

It is preferred that the halftone convertor unit 14, the halftone adjustment unit 18, the thresholding unit 22, the temperature prediction unit 28, and the counter 26 are arranged in combination in a software routine or algorithm, such as a software program which is stored on a computer readable medium. Any of a number of conventional programming languages may be used to create the routine, such as, for example, C, C++, or the routine can be implemented in a special purpose programming language. Each of the units 14, 18, 22, 26, and 28 may comprise a module or subroutine of the main program. These routines will have access to the halftone LUT 16 as well as the halftone adjustment LUT 20 and can be stored in firmware located within the printer itself, or can be stored in printer driver software utilized by a computer driving the printer.

As noted above, the system of FIG. 1 minimizes unintended shade shifts that may occur in an image due to the changes in temperature of the ink-jet print head, and can do so without adjusting print head parameters, such as pulse magnitude or firing frequency, and without the need for temperature sensing means. By adjusting halftone levels, the probabilities of printing dots at various pixel locations are adjusted, and, accordingly, the binary halftone values (1's and 0's), which control number of dots to be printed, are adjusted.

Figure 3:
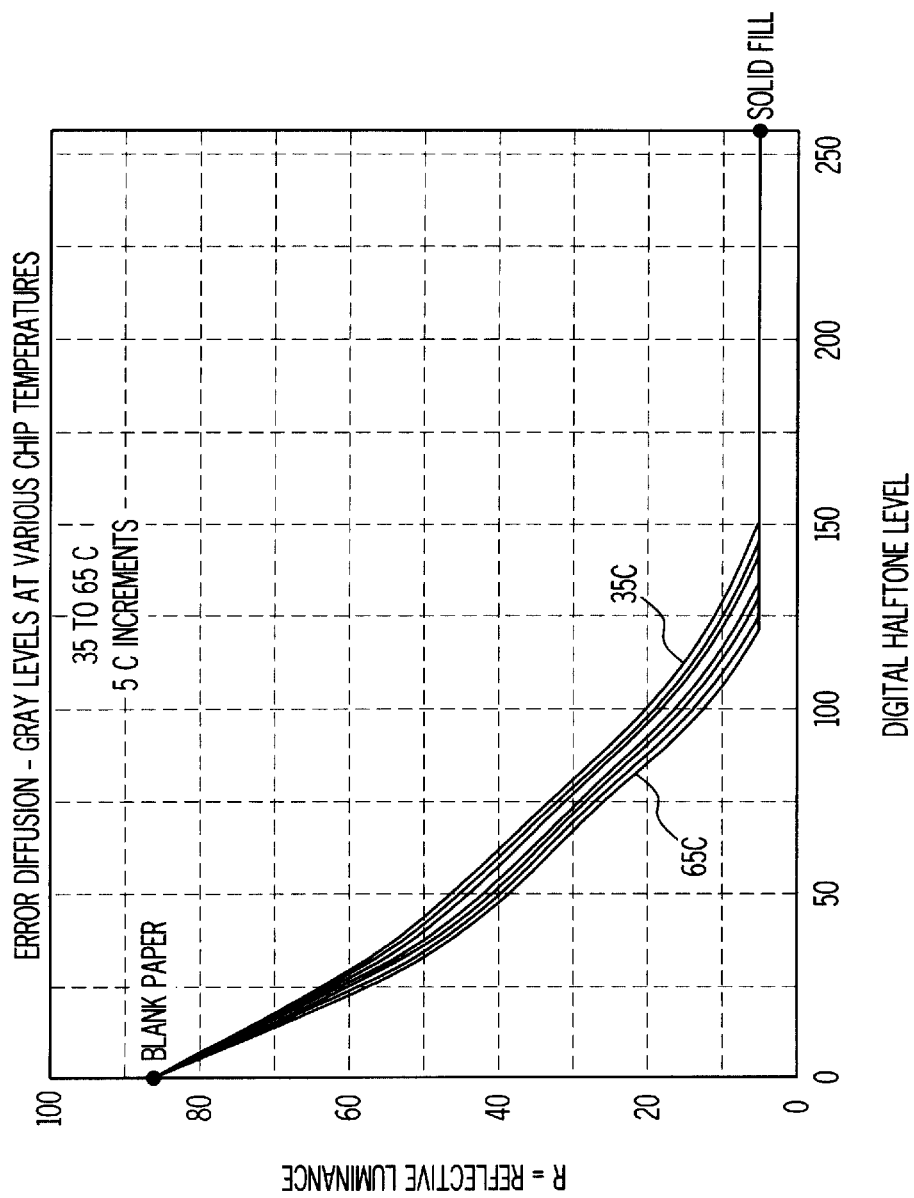
FIG. 3 is a graph showing the effects of print head temperature on reflective luminance of the printed images at various halftone levels.

As also noted above, if no such compensation is made for print head temperature, the desired gray tones will be lighter or darker than expected due to the print head temperature. This effect is particularly noticeable when occurring from swath to swath (i.e., when both swaths are intended to look identical but one swath looks darker), but is also noticeable when occurring between various section of the printed image, as well as between various pages. FIG. 3 is a graph showing how uncompensated temperature shifts may affect the reflective luminance of the printed image. As shown in the figure, as the temperature of the print head increases, the reflective luminance of the image will typically decrease for a given desired halftone level (i.e., gray scale level). Accordingly, because a lower reflective luminance means that less light is reflected and the image appears darker, an image printed at a high print head temperature will look darker than when it is printed at a lower temperature. The figure gives an example how increasing the temperature in 5C increments from 35C to 65C may affect the reflective luminance of the image, and, therefore, the visual appearance of the image. For the halftone level of 100, for example, the graph shows a reflectance value of approximately 20 at 35C and approximately 12 at 65C, thereby indicating that the halftone level of 100 will look significantly darker when printed at a print head temperature of 65C than at 35C. Accordingly, at 65C, the halftone adjustment unit 18 of FIG. 1 would decrease this halftone level from 100 (a value of 95 might be utilized, for example) to thereby print fewer dots per unit area and accordingly compensate for the thermally induced droplet size increase.

Figure 4:
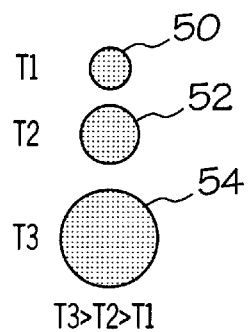
FIG. 4 is an enlarged view illustrating the increase in the dot size created by an ink-jet nozzle as the temperature of the print head rises.

FIG. 4 is an enlarged view illustrating how the spot produced by a nozzle of an ink-jet print head will increase with an increase in temperatures. Spots 50, 52, and 54 represent spots created by the nozzle of an ink-jet print head at temperatures T1, T2, and T3, respectively, wherein T3 is greater than T2, and T2 is greater than T1. As shown in the figure, the spot created tends to increase as the temperature is increased from T1 to T3, due to the larger bubble which grows in the ink-jet chamber at higher temperatures.

Figure 5A:
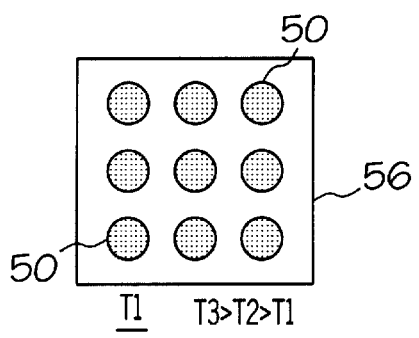
FIG. 5 is an enlarged view depicting the effects of adjusting halftone levels according to print head temperature changes, such as can be accomplished by the system of FIG. 1.
Figure 5B:
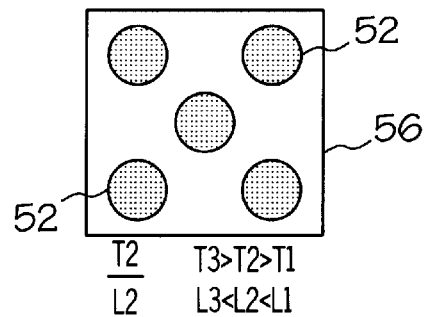
Figure 5C:
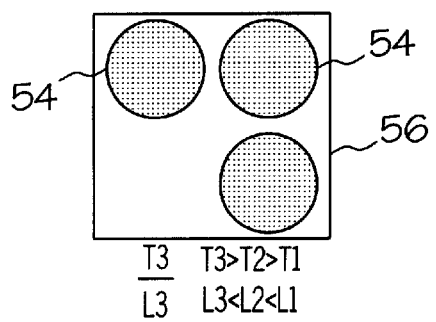

FIG. 5 is an enlarged view illustrating how the system of FIG. 1 can compensate for this increase in droplet size. As the temperature increases from T1 to T3 in FIG. 5a through FIG. 5c, the gray scale level can be decreased from L1 to L3 by the halftone adjustment unit 18 of FIG. 1 using empirically created halftone adjustment LUT 20, thereby causing fewer spots to be printed per unit area 56. On the much smaller scale of the ink-jet printer than that of FIG. 5, an image portion created by printing several small dots can look approximately the same shade of gray as the same portion created by printing fewer but larger dots, because the total area covered by the dots (i.e., dot coverage) remains approximately the same. The control of the number of dots printed per unit area can be effectuated by the control of the halftone levels printed, as described above under FIG. 1, because the halftone level directly corresponds to probabilities of printing dots at various locations, and, thus, corresponds to the number of dots printed per unit area.

FIG. 6 is a flow diagram illustrating one method for compensating for the temperature effects on a print head, such as could be performed by the combination of the halftone converter unit 14, the halftone adjustment unit 18, and the thresholding unit 22 of FIG. 1. This method could be embodied in the form of a computer program, and the units 14, 18, and 22 could be embodied in the form of a computer which operates the program.

According to the method, at step 100, the source image data is obtained from a source, such as a computer or scanner device. This data is preferably input one slice at a time for the swath to be printed, starting from the left side of the image and moving to the right side of the image. A slice is a vertical portion of the swath, corresponding to a vertical column of nozzles on the print head.

At step 102, the slice of the source image is converted to halftone levels, such as by using a look-up-table, as is known in the art of converting source images to halftone levels. In general, each pixel of the slice to be printed is assigned a number according to its shade and these numbers represent probabilities, called halftone levels, of printing a dot at that pixel. Preferably, 256 (0–255) numbers are used so that 256 discrete shades of gray can be represented. Alternatively, the image data may already exist in the source (e.g., in a computer) in the desired halftone form, such as in the form of halftone levels ranging from 0 to 255, in which case step 102 would not be necessary.

After the halftone levels are initially assigned to the pixels in the slice (referred to as "nominal" halftone levels in FIG. 6), step 104 is executed wherein a look-up-table is selected based upon the current operating temperature of the print head. Preferably, the temperature is predicted prior to step 104, and as described in greater detail below. However, it is to be understood that temperature sensors or other temperature estimation mechanisms could be used to estimate the temperature of the print head or some portion of the print head. A directly measured or sensed temperature will be referred to herein as an estimation of the temperature because of possible errors in measurement and because the measured temperature will not correspond exactly to the temperature at each nozzle and/or each portion of the print head. At step 104, a number of LUT's can be provided for the various operating temperatures of the print head, and the correct table selected based upon the actual temperature of the print head. Each lookup table preferably maps each possible "nominal" halftone level to an "adjusted" halftone level, such as shown in FIG. 2 and described above. Such a table can be created empirically by printed patches for the various "nominal" halftones at a certain predetermined print head temperature and then printing the same halftones at various other print head temperatures. It can then be determined by observation how the various printed shades of gray match up from temperature to temperature, and the lookup tables can be created accordingly, as described above with respect to FIG. 2.

After the correct table has been selected, step 106 is executed and the "adjusted" halftone levels for each pixel in the slice are determined by selecting the "adjusted" halftone level from the table that corresponds to the "nominal" halftone level that was assigned to the pixel in step 102, such as by using a lookup function. If the temperature detected does not correspond to a temperature for which a lookup table was created, the adjusted halftone level can be extrapolated or interpolated from the existing LUT's, at step 106. In this case, at step 104, the LUT's which are closest to the detected temperature would be selected, and then, at step 106, the "adjusted" halftone level can be interpolated from the selected LUT's. Alternatively, the LUT can be selected at step 104 which is closest to the detected temperature.

Then, at step 108, an array of random values, known in the art as a "threshold array", is assigned to the pixels of the slice to be printed. These values should be selected from a range that corresponds to the range of halftone levels for the printer. Thus, if 256 halftone levels are used, each value of the array should be selected from the range 0–255. This step may not be necessary if a predetermined array is to be used which may provide better quality images than a random array, such as a Bayer matrix or a blue noise matrix, as disclosed in U.S. Pat. No. 5,708,518, issued to Parker, which is incorporated herein by reference.

At step 110, the adjusted halftones for the pixels of the slice are then compared to the threshold values which are assigned to these pixels. For each pixel, if the adjusted halftone level is greater than the threshold value, the pixel is turned on, such as by taking on a binary halftone value of 1 for that pixel. A binary halftone value of 1 will cause a black dot to be printed at that pixel location on the paper. However, if the adjusted halftone level is less than the assigned threshold value, the pixel is turned off, such as by taking on a binary halftone value of 0, such that no dot will be printed at the pixel. Regardless of the comparison, an adjusted halftone level of 255 means that a dot should definitely be printed and an adjusted halftone level of 0 means that a dot should not be printed. As can be understood, an adjusted halftone level that is close to 255 will have a much greater chance of having a dot printed at the location than would a value that is close to 0. This "thresholding" or "probabilistic" technique of steps 108 and 110 is preferred because it prevents the dots from forming low frequency patterns on the page, which can be distracting to the viewer. However, it should be understood that other techniques can be utilized for determining whether to print a dot at a pixel that has a certain adjusted halftone level, without departing from the scope of this invention. For example, a portion of an image having a halftone level of 128 on a 0–255 scale could be obtained by printing every other dot in the portion.

Once it is determined at which pixels of the slice dots will be printed, the binary output, or bitmap of binary halftone values, for the slice is output to the swath memory, at step 112. The bitmap in the swath memory is utilized by the printer driver circuit to selectively send pulses to the nozzles of the print head at the desired locations in the slice of the print medium, as is known in the art of binary ink-jet printing.

As the binary output is provided to the swath memory, step 114 is executed, wherein the total number of 1's that are outputted are counted. Because a "1" corresponds to a pixel that will be printed, the number of 1's corresponds to the number of dots that will be printed in that particular slice. As noted above, the greater the number of dots printed per slice, the higher the print head temperature, due to the heat emitted from the heater chip in the print head.

Thus, the number of dots printed is related to the print head temperature, and, the print head temperature can be predicted from the number of dots printed, at step 116. One way of predicting the temperature from the count of the dots printed would be to compare the count to various ranges, each range corresponding to a predicted print head temperature. The ranges and the corresponding print head temperature can be obtained empirically and will depend on the particular construction of the print head utilized. In addition, the number and sizes of the ranges can be varied depending upon the level of accuracy desired. The estimated print head temperature can then be utilized by step 104 for selecting an LUT for use in obtaining temperature adjusted halftone levels.

It is contemplated that step 116 could be deleted, in which case the count of step 114 could be fed directly to step 104. Then, at step 104, the temperature would be in the form of a count of the number of "1's" in the swath memory rather than in the form of degrees Celsius or Fahrenheit, and the LUT could be selected directly from this estimated form of the temperature.

Thus, the method FIG. 6 can be utilized to compensate for thermally induced print irregularities in the printed images produced by an ink-jet printer. The method adjusts the halftones levels (or probabilities) of the pixels of the image to be printed according to the temperature of the print head, and thereby adjusts the number of dots that will be printed per unit area based upon the temperature. The method does not require a temperature sensor because the temperature of the print head is predicted (or estimated) based upon the total number of dots printed by the print head. It is contemplated that other methods may be utilized to adjust the number of dots per unit area based upon temperature without departing from the scope of this invention. For example, instead of adjusting the halftone levels of the pixels of the image to be printed, the threshold levels or threshold matrix utilized may be adjusted upwardly or downwardly based upon temperature, to achieve the same effect. The frequency of temperature prediction and adjustment can be varied as desired; i.e., the temperature can be estimated and an adjustment LUT selected after printing each pixel, after printing each slice, or after printing each swath.

The method according to this invention can be embodied in a number of manners. For example, the method can be embodied as an article of manufacture by configuring the method on an ASIC, or as firmware on a ROM, PROM, or EEPROM, or as a program on a computer readable medium, such as a computer hard disk, a CD-ROM or other persistent storage medium. The method can also be embodied as a special purpose apparatus having executable instructions suitable for carrying out the invention stored in a RAM or ROM, or a combination of both. Moreover, the method can be implemented in any conventional programming language, such as, for example, "C" programming language, or can be implemented in a special purpose programming language.

While it is preferred that, at step 116, the temperature is predicted for each slice printed and the counter reset to zero after each slice, the temperature may be predicted more or less frequently as desired. Moreover, the temperature may be estimated in other manners without departing from the scope of the invention. For example, the temperature can be predicted based upon the average number of dots printed per slice in the current swath, the average number of dots printed per swath on the page, the total number of dots printed in the swath, and/or the number of dots printed per unit time.

Figure 7:
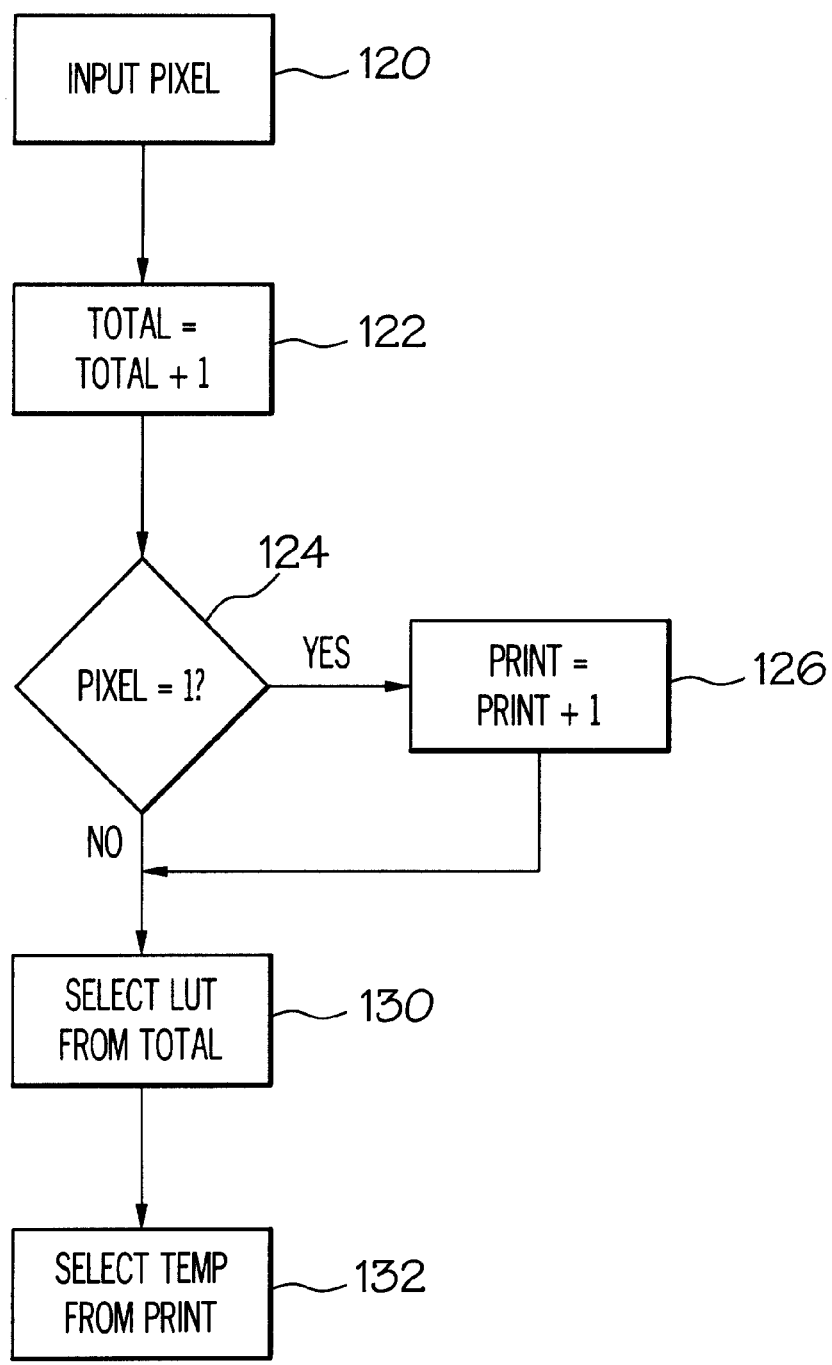
FIG. 7 is a flow diagram depicting a method for predicting print head temperature based upon the proportion of dots ejected to total dots in the swath, such as could be used with the method of FIG. 6 and by the temperature prediction unit of FIG. 1.

One alternative method of predicting temperature is depicted in FIG. 7, wherein the temperature is predicted based upon the proportion of the dots to be printed to the total dots sent to the swath memory. As shown in FIG. 7, while the binary output is provided to the swath memory, each pixel of the swath is input to the method, at step 120. Then, at step 122, a counter "Total" is incremented by one for each pixel that is provided, so as to keep a running tally of the number of pixels sent to the driver circuit to be printed. At step 124, it is determined whether the pixel has a value of "1", meaning that a dot will be printed, or a value of "0", meaning that a dot will not be printed. If the pixel has a value of "1", then another counter called "Print" is incremented by one, so as to keep a count of the number of dots printed in the swath.

Then, an LUT can be selected from a plurality of LUT's which corresponds to the total number of pixels that have been output to swath memory, as indicated by the counter "Total". This step is indicated in FIG. 7 as step 130. Once the LUT has been selected, an estimated temperature of the print head can be selected from the LUT based upon the "Print" count calculated in step 128. The temperatures which correspond to the various "Print" counts can be determined experimentally, such as by printing various swaths at a various halftone levels and measuring the print head temperatures, the "Print" count, and the "Total" count at various points across the swath. These LUT's will vary among various print head types and printers, as they will be dependent upon the print head constructions and the printer parameters. If a predicted temperature is not available in the LUT's for the current "Total" or the current "Print" count, the temperature can be extrapolated or interpolated from the data which is available.

While preferred exemplary embodiments of the present invention have been described above, it is to be understood that further adaptations of the invention described herein can be obtained by appropriate modifications by one of ordinary skill in the art without departing from the scope of the present invention. Accordingly, although preferred configurations of methods, devices, and systems embodying the present invention have been described, it should be understood that these methods, devices, and systems may take on a wide variety of configurations and arrangements without departing from the scope of the present invention. For example, the methods of the present invention could comprise computer programs, and such programs may take on a number of forms, utilize a variety of variable names and commands, and be implemented in any of a number of programming languages without departing from the scope of the invention. Furthermore, the steps of the methods of the present invention may be practiced in a number of orders, without departing from the scope of the invention. In addition, it is contemplated that the effects of temperature on halftone level could be estimated by an equation, and that the equation could be used during printer operation to calculate adjusted halftone levels, rather than utilizing lookup tables. Therefore, the scope of the present invention should be considered in terms of the following claims and should not be limited to the details of the structures and methods shown and described above.

What is claimed is:

1. An image processing apparatus for use in a binary printer, comprising:
   a temperature estimation unit configured to estimate a temperature of a print head; and
   an image adjustment unit configured to receive the estimated print head temperature from the temperature estimation unit and to receive image data, wherein the image adjustment unit is also configured to determine the number of dots to be printed by the print head based upon the estimated print head temperature and the image data;
   wherein the image data comprises probabilities of printing dots at various pixel locations, and wherein the adjustment unit is configured to adjust the probabilities based upon the estimated temperature and to use the adjusted probabilities to determine the number of dots to be printed.

2. The apparatus as recited in claim 1, wherein the adjustment unit further comprises:
   a thresholding unit configured to compare the adjusted probabilities to an array of values and to determine the number of dots to be printed based upon the comparison.

3. The apparatus as recited in claim 1, wherein the adjustment unit further comprises:
   a plurality of lookup tables, each lookup table corresponding to a print head temperature and having adjusted probabilities stored therein, wherein the lookup tables are accessed by the adjustment unit for selecting adjusted probabilities based upon the estimated temperature and the image data.

4. The apparatus as recited in claim 1, wherein the temperature estimation unit comprises:
   a counter configured to provide a count of the number of dots to be printed by the print head over some predetermined portion of an image; and a temperature predictor in communication with the counter, wherein the temperature predictor is configured to predict the temperature of the print head based upon the count.

5. The apparatus as recited in claim 1, wherein the temperature estimation unit comprises:

a temperature sensor connected to the print head.

6. The apparatus as recited in claim 1, further comprising:

an image data storage unit adapted to store at least a portion of the image data and provide the data to the adjustment unit; and an ink-jet print head controlled by the adjustment unit to print the number of dots determined by the adjustment unit.

7. A method of compensating for the effects of thermally induced droplet size variations in a binary printer having a print head for producing a printed image from a source image by selectively producing dots on a substrate, the method comprising the steps of:

estimating a temperature of a print head;

receiving image data; and deciding whether to print a dot at each of a plurality of pixel locations based upon the estimated temperature and the image data received;

wherein the image data comprises a plurality of nominal halftone levels, each halftone level corresponding to a pixel, and wherein the deciding step comprises the steps of:

selecting a predetermined set of data from a plurality of sets of data based upon the estimated temperature, wherein each of the plurality of sets of data corresponds to a print head temperature;

selecting an adjusted halftone level for each pixel from the selected set of data based upon the nominal halftone level for the pixel;

comparing each of the adjusted halftone levels to a threshold value obtained from an array; and providing a binary halftone value for each pixel based upon the comparison, wherein the binary halftone value has a first state if a dot is to be printed at the pixel location and a second state if a dot is not to be printed.

8. The method as recited in claim 7, wherein the image data represents a slice of a source image, wherein the array is a Bayer matrix, and wherein the method is repeated for each slice of the source image.

9. The method as recited in claim 7, wherein each set of data is constructed by the steps of:

printing a first plurality of small patches corresponding to each possible halftone level, wherein the print head temperature is maintained at a substantially constant nominal temperature during the printing;

printing a second plurality of small patches corresponding to each possible halftone level, wherein the print head temperature is maintained at a second temperature during the printing;

comparing each patch from the first plurality of printed patches to a patch from the second plurality of printed patches; and determining the adjusted halftone levels for the set of data based upon the comparison.

10. The method as recited in claim 7, wherein the temperature estimating step comprises the steps of:

counting a number of dots to be printed by the print head; and selecting the temperature from a set of data based upon the count.

11. The method as recited in claim 7, wherein the method is encoded on a computer readable medium.

12. An image processing apparatus for use in a binary halftone printer, comprising:

a temperature estimation unit configured to estimate a temperature of a print head; and a halftone adjustment unit configured to receive the estimated print head temperature from the temperature estimation unit and to receive image data comprising nominal halftone values, each nominal halftone value corresponding to a pixel, wherein the adjustment unit is configured to determine binary halftone values based on the estimated print head temperature and the nominal halftone values.

13. The apparatus as recited in claim 12, wherein the adjustment unit is configured to convert the nominal halftone values into adjusted halftone values based upon the estimated temperature, and wherein the adjustment unit further comprises:

a thresholding unit configured to compare the adjusted halftone values to an array of values and for determining the binary halftone values based upon the comparison.

14. The apparatus as recited in claim 13, wherein the adjustment unit further comprises:

a plurality of lookup tables, each lookup table corresponding to a print head temperature and having adjusted halftone values stored therein, wherein the adjustment unit is configured to select a lookup table based upon the estimated temperature and to select an adjusted halftone value for each pixel from the selected table based upon the nominal halftone value for the pixel.

15. The apparatus as recited in 12, further comprising:

a temperature controller configured to control the print head temperature to within a range which is less than or equal to about 40C.

16. The apparatus as recited in claim 12, wherein the temperature estimation unit comprises:

a counter configured to provide a count of the number of dots to be printed by the print head; and a temperature predictor in communication with the counter configured to predict the temperature of the print head based upon the count.

17. The apparatus as recited in claim 12, wherein the temperature estimation unit comprises:

a temperature sensor connected to the print head.

18. The apparatus as recited in claim 12, further comprising:

an ink-jet print head for printing dots by binary ink-jet printing;

a print head driver unit for receiving the binary halftone values and for controlling the ink-jet print head to print dots according to the binary halftone values; and an image data storage unit for storing at least a portion of the image data and for providing the image data to the adjustment unit.

19. An apparatus for estimating the temperature of a print head, comprising:

an energy estimation unit configured to estimate the energy supplied to a print head; and a temperature estimation unit configured to receive the estimated energy from the energy estimation unit and to determine an estimated print head temperature based upon the estimated energy;

wherein the energy estimation unit comprises a counter for counting binary halftone values, wherein the count represents the estimated energy.

20. A method of predicting the temperature of a print head in a printer based upon energy supplied to the print head, the method comprising:

estimating the energy to be supplied to the print head; and predicting a print head temperature from the energy based upon a predetermined relationship between the energy to be supplied and print head temperature.

21. The method as recited in claim 20, wherein the estimating step comprises the step of:

counting the number of dots be printed by the print head.

22. The method as recited claim 21, wherein the predicting step comprises the steps of:

providing a lookup table, wherein the table comprises a plurality of print head temperatures and a plurality of ranges corresponding to numbers of dots printed, and wherein each range is associated with a print head temperature;

selecting a range from the lookup table that corresponds to the number of dots counted; and selecting from the lookup table the print head temperature associated with the range.

23. The method as recited in claim 20, wherein the energy is estimated based upon the magnitude of pulses supplied to the print head, the duration of the pulses, and the number of the pulses.

24. A method of compensating for the effects of thermally induced droplet size variations in a binary printer having a print head for producing a printed image from a source image by selectively producing dots on a substrate, the method comprising the steps of:

estimating a temperature of a print head;

receiving image data; and deciding whether to print a dot at each of a plurality of pixel locations based upon the estimated temperature and the image data received;

wherein the image data comprises a plurality of halftone levels, each halftone level corresponding to a pixel, and wherein the deciding step comprises the steps of:

selecting an array of values from a plurality of arrays based upon the estimated temperature;

comparing the halftone level for each pixel in the image data to a value in the selected array; and providing a binary halftone value for each pixel based upon the comparison, wherein the binary halftone value has a first state if a dot is to be printed at the pixel location and a second state if a dot is not to be printed, wherein the number of dots to be printed is defined by the number of bits in the first state.

25. The method as recited in claim 24, wherein the temperature estimating step comprises the steps of:

counting a number of dots to be printed by the print head; and selecting the temperature from a set of data based upon the count.

26. A method of compensating for the effects of thermally induced droplet size variations in a binary printer having a print head for producing a printed image from a source image by selectively producing dots on a substrate, the method comprising the steps of:

estimating a temperature of a print head;

receiving image data; and deciding whether to print a dot at each of a plurality of pixel locations based upon the estimated temperature and the image data received;

wherein the method is encoded on a computer readable medium.

27. The method as recited in claim 26, wherein the temperature estimating step comprises the steps of:

counting a number of dots to be printed by the print head; and selecting the temperature from a set of data based upon the count.

* * * * *